US012698986B2

(12) United States Patent
Lugani

(10) Patent No.: US 12,698,986 B2
(45) Date of Patent: Aug. 4, 2026

(54) INDUCTIVE POSITION SENSOR

(71) Applicant: Melexis Technologies SA, Bevaix (CH)

(72) Inventor: Lorenzo Lugani, Bevaix (CH)

(73) Assignee: Melexis Technologies SA, Bevaix (CH)

( * ) Notice: Subject to any disclaimer, the term of this patent is extended or adjusted under 35 U.S.C. 154(b) by 147 days.

(21) Appl. No.: 18/805,982

(22) Filed: Aug. 15, 2024

(65) Prior Publication Data

US 2024/0401984 A1      Dec. 5, 2024

Related U.S. Application Data

(63) Continuation of application No. 17/203,039, filed on Mar. 16, 2021, now Pat. No. 12,104,931.

(30) Foreign Application Priority Data

Mar. 25, 2020      (EP) ..................................... 20165685

(51) Int. Cl.
  *G01D 5/20*      (2006.01)
  *G01B 7/30*      (2006.01)
(52) U.S. Cl.
  CPC ............. *G01D 5/2073* (2013.01); *G01B 7/30* (2013.01)
(58) Field of Classification Search
  CPC ................................ G01D 5/2073; G01B 7/30
  See application file for complete search history.

(56) References Cited

U.S. PATENT DOCUMENTS

| | | | |
|---|---|---|---|
| 4,986,124 A | 1/1991 | Byrne et al. | |
| 6,304,832 B1 | 10/2001 | Andermo et al. | |
| 6,483,295 B2 | 11/2002 | Irle et al. | |
| 6,788,221 B1 | 9/2004 | Ely et al. | |
| 6,828,783 B2 * | 12/2004 | Schroter .............. | G01D 5/2053 324/207.17 |
| 7,190,158 B2 * | 3/2007 | Tiemann .............. | G01D 5/2053 324/207.17 |
| 7,239,130 B1 | 7/2007 | Milvich | |
| 10,845,216 B2 | 11/2020 | Utermoehlen et al. | |
| 10,907,992 B2 | 2/2021 | Utermoehlen et al. | |
| 2007/0085530 A1 | 4/2007 | Mawet | |
| 2010/0231206 A1 | 9/2010 | Kobayashi | |
| 2019/0017845 A1 | 1/2019 | Utermoehlen et al. | |

(Continued)

FOREIGN PATENT DOCUMENTS

| | | | |
|---|---|---|---|
| DE | 102016202867 B3 | 4/2017 | |
| DE | 102016202871 B3 | 6/2017 | |

(Continued)

OTHER PUBLICATIONS

Search Report from corresponding EP Application No. EP20165685.7, Aug. 31, 2020.

(Continued)

*Primary Examiner* — Walter L Lindsay, Jr.
*Assistant Examiner* — Milton Gonzalez
(74) *Attorney, Agent, or Firm* — Workman Nydegger

(57)      ABSTRACT

A position sensor is for determining the position of a conductive target using a transmit coil and a plurality of receive coils. The receive coils may each include two strands and a strand may be obtained from a conversion of a substantially sinusoidal primitive function. The position sensor may realize a reduction of harmonics in signals from the receive coils.

10 Claims, 6 Drawing Sheets

(56) References Cited

U.S. PATENT DOCUMENTS

| | | |
|---|---|---|
| 2019/0025088 A1 | 1/2019 | Utermoehlen et al. |
| 2019/0094047 A1 | 3/2019 | Utermoehlen et al. |
| 2020/0116529 A1 | 4/2020 | Oshinubi et al. |
| 2020/0200569 A1 | 6/2020 | Utermoehlen et al. |
| 2021/0055135 A1 | 2/2021 | Smith et al. |
| 2021/0302206 A1 | 9/2021 | Ferreira Da Cunha et al. |
| 2022/0136868 A1 | 5/2022 | Fontantet et al. |

FOREIGN PATENT DOCUMENTS

| | | | |
|---|---|---|---|
| EP | 0905484 | A2 | 3/1999 |
| EP | 1881299 | A2 | 1/2008 |
| EP | 2570776 | A2 | 3/2013 |
| WO | 2010149910 | A2 | 12/2010 |

OTHER PUBLICATIONS

Search Report from corresponding EP Application No. EP12184527. 5, Oct. 7, 2014.

* cited by examiner

INDUCTIVE POSITION SENSOR

FIELD OF THE INVENTION

The invention relates to the field of position sensors. More specifically it relates to a position sensor which is configured for determining the position of a conductive target.

BACKGROUND OF THE INVENTION

Typical angular inductive position sensors are composed of a transmit coil exciting a metal target, which in turn generates an induced voltage in a set of receive coils. A target influences the coupling between the transmit and the receive coils, thus generating a signal in the receive coils. In such an angular position sensor the amplitude of the received signals is dependent on the angular position of the target. This allows reconstructing the target angle from the amplitude of the received signals. Ideally, one would like to dispose of high quality signals allowing for a simple angle calculation procedure. This condition could be met if the receive coils were providing signals whose amplitude varies perfectly sinusoidally with the target angle. In that case, two orthogonal receive coils would be sufficient, and the angle could be simply computed by making the arctangent of the ratio of the two signals.

In practice, however, the receive coils do not provide signals which are exactly sinusoidal. The signals are mainly sinusoidal but contain also several harmonic components that are sources of angular error.

There is therefore a need for position sensors and methods for making position sensors which are able to reduce the error caused by these harmonics.

SUMMARY OF THE INVENTION

It is an object of embodiments of the present invention to provide a good inductive position sensor and a method for making such a sensor.

The above objective is accomplished by a method and device according to the present invention.

In an first aspect embodiments of the present invention relate to a position sensor for determining the position of a conductive target.

The position sensor comprises:
at least one transmit coil,
a first, second and third receive coil enclosed by the transmit coil. Each receive coil has a predefined electrical period which is the same for each receive coil and wherein each receive coil comprises a first conductive strand and a second conductive strand wherein, for an angular position sensor, the first strand of a receive coil corresponds with a substantially sinusoidal primitive function which is converted to polar coordinates given the electrical period, and wherein, for a linear position sensor, the first strand corresponds with the primitive function which is scaled given the electrical period, and wherein the primitive function of the second strand is the primitive function of the first strand shifted over 180°, and wherein both strands are electrically connected so that a continuous coil is formed with two open ends, and wherein the primitive function of a strand of the second receive coil is the primitive function of a corresponding strand of the first receive coil shifted over 120°, and wherein the primitive function of a strand of the third receive coil is the primitive function of the corresponding strand of the first receive coil shifted over 240°,
the conductive target which overlaps the receive coils,
an integrated circuit which is configured for exciting the transmit coil, thus inducing signals on the receive coils, and for reading the signals from the receive coils or a combination of the signals, and for processing these signals wherein the position sensor is configured for removing a common mode signal from these signals.

It is an advantage of embodiments of the present invention that even harmonics in the signals from the receive coils are rejected because of the use of the pairs of first strands, and second strands. In embodiments of the present invention these pairs of strands are connected so that their voltages subtract.

It is an advantage of embodiments of the present invention that a tri-phase configuration is implemented. The inventor has found out that the third harmonic component of the signals generated by the first, second and third receive coil can be removed by removing the common mode component of these signals.

It is, moreover, advantageous that the effect of 5th harmonic components in the field pattern is eliminated by the design of the receive coils via a substantially primitive function.

In embodiments of the present invention the conductive target has flanges arranged in a periodic arrangement and the flanges are identical.

In embodiments of the present invention the first strand and the second strand are provided on a printed circuit board. In embodiments of the first strand and/or the second strand alternate between the first and second side of the printed circuit board for enabling crossings between both strands.

In embodiments of the present invention processing the signals comprises offset compensation of the signals.

In embodiments of the present invention processing the signals comprises extracting a position of the conductive target from the obtained signals.

In embodiments of the present invention the position sensor is configured for detecting an angular position of the conductive target.

In embodiments of the present invention the transmit coil is a circular coil with multiple turns placed on the close periphery of the receive coils.

In embodiments of the present invention the angular position is obtained by a Clarke transformation or by a tracking loop.

In embodiments of the present invention the conductive target is a circular target with N protrusions (with N a natural number) or a half moon target.

In embodiments of the present invention the circular target has N protrusions (with N a natural number, e.g. larger than 1, or larger than 3 or larger than 4) and the transmit and receive coils are only extending over a limited number of these protrusions which is less than the total number of protrusions.

In embodiments of the present invention the transmit coil is a C-shaped transmit coil.

In embodiments of the present invention the position sensor is a linear position sensor.

In a second aspect embodiments of the present invention relate to the use of a position sensor according to embodiments of the present invention wherein.
the transmit coil is excited using an excitation signal, signals from the first, second, and third receive coils are read, the obtained signals are processed for obtaining the position of the conductive target, wherein processing at least comprises removing a common mode component of the received signals.

In a third aspect embodiments of the present invention relate to a method of forming a position sensor according to embodiments of the present invention. The method comprises:

defining a substantially sinusoidal primitive function, for an angular position sensor, converting the primitive function to polar coordinates given the predefined electrical period for defining the first strand of the first receive coil, or for a linear position sensor, scaling the primitive function given the predefined electrical period, obtaining the second strand from the primitive function shifted over 180°, obtaining the second receive coil wherein the primitive function for obtaining the second receive coil is the primitive function of the first receive coil shifted over 120°, obtaining the third receive coil wherein the primitive function of the third receive coil is the primitive function of the first receive coil shifted over 240°, providing an integrated circuit which is configured for exciting the transmit coil, for reading the signals from the receive coils, and for processing these signals wherein processing the signals comprises removing a common mode signal from these signals.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
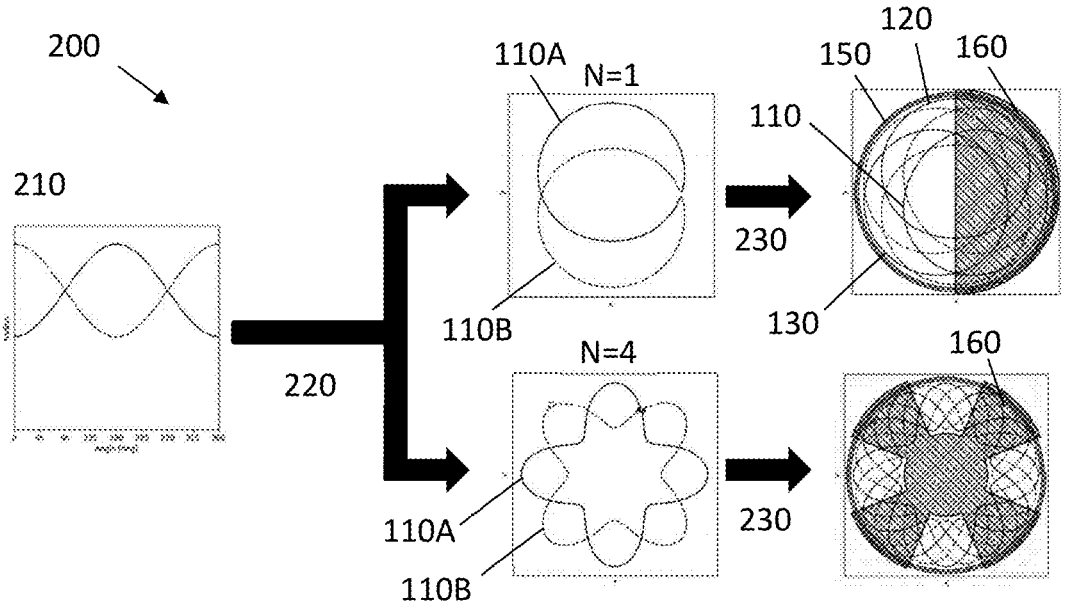
FIG. 1 shows schematic drawings of angular position sensors in accordance with embodiments of the present invention and illustrates a method for obtaining such position sensors in accordance with an embodiment of the present invention.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In a first aspect embodiments of the present invention relate to a position sensor 100 for determining the position of a conductive target 160. Schematic drawings of exemplary embodiments of such position sensors are shown in FIG. 1, FIG. 2, FIG. 3, FIG. 4, FIG. 5, FIG. 10, and FIG. 11 and FIG. 12. A position sensor 100 in accordance with embodiments of the present invention comprises at least one transmit coil 150, a first 110, second 120 and third receive coil 130, and a conductive target 160.

The first 110, second 120 and third receive coil 130 are enclosed by the transmit coil 150, and each receive coil 110, 120, 130 has a predefined electrical period that is the same for each receive coil.

Each receive coil 110, 120, 130 comprises a first conductive strand 110A, 120A, 130A and a second conductive strand 110B, 120B, 130B.

For an angular position sensor 100, the first strand of a receive coil corresponds with a substantially sinusoidal primitive function which is converted to polar coordinates given the electrical period.

For a linear position sensor, the first strand corresponds with the primitive function which is scaled given the electrical period.

In embodiments of the present invention the primitive function of the second strand is the primitive function of the first strand shifted over 180°. For an angular position sensor the second strand of a receive coil corresponds with a primitive function of the second strand which is converted to polar coordinates given the electrical period.

For a linear position sensor, the second strand corresponds with the primitive function of the second strand which is scaled given the electrical period.

The primitive function of a strand of the second receive coil is the primitive function of the corresponding strand of the first receive coil shifted over 120°, and the primitive function of a strand of the third receive coil is the primitive function of the corresponding strand of the first receive coil shifted over 240°.

In case of an angular position sensor 100 the conductive target 160 is rotatable around a central axis and the position is expressed as an orientation angle of the target 190. In such an angular position sensor the receive coil is centered around the central axis with a radius which is varying substantially sinusoidal in an angular direction.

In case of a linear position sensor 100 the conductive target 160 is movable in a linear direction along a center line. For a linear position sensor a distance of the receive coil to the center line is changing substantially sinusoidal along the center line.

The conductive target 160 overlaps the receive coils.

In embodiments of the present invention the position sensor comprises an integrated circuit 170 which is configured for exciting the transmit coil 150, for reading the signals (e.g. voltage, or voltage related signal) or a combination of the signals from the receive coils 110, 120, 130, and for processing these signals. In embodiments of the present invention the integrated circuit is configured for processing the signals such that an angular position of the target is obtained in case of an angular position sensor and such that a linear position of the target is obtained in case of a linear position sensor. In embodiments of the present invention a common mode signal is removed from the signals of the coils. This may be achieved by processing the signals read by the integrated circuit, or the common mode signal may already be removed from the combination of signals.

Figure 2:
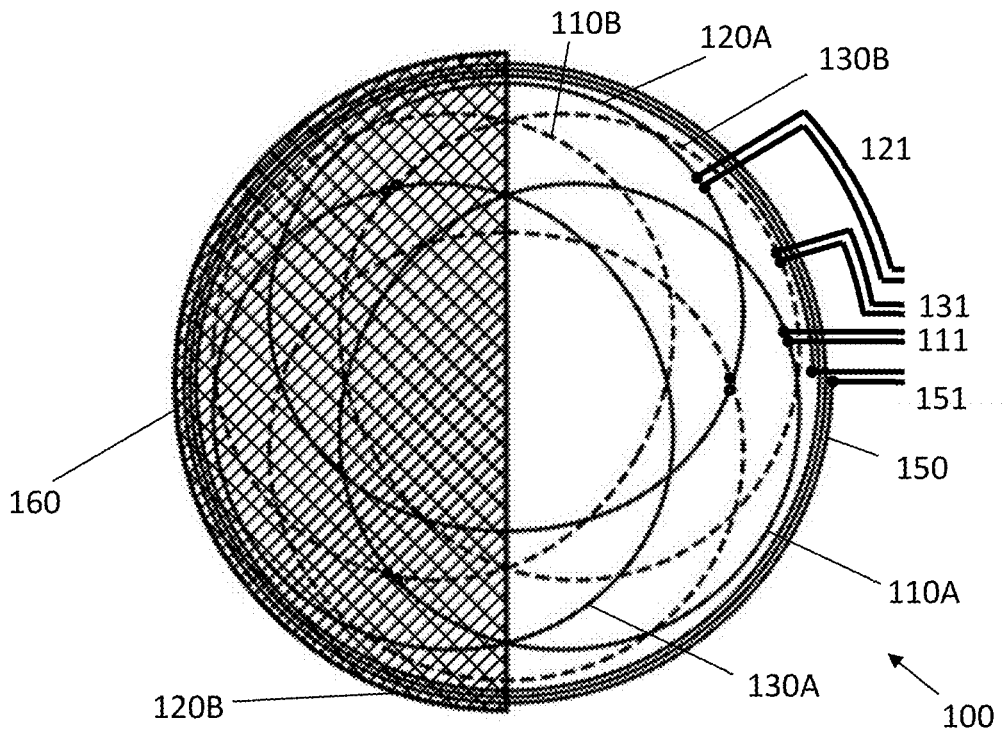
FIG. 2 shows a schematic drawing of an angular position sensor with an electrical period of 360° in accordance with embodiments of the present invention.

FIG. 2 shows a schematic drawing of a coil configuration in accordance with embodiments of the present invention. The first strands (A) of the first 110, second 120, and third 130 receive coil are represented by a fixed line and the second strands (B) are represented by a dashed line. The transmit coil 150 is enclosing the receive coils. The target 160 overlaps the receive coils. In embodiments of the present invention the transmit coil and the receive coils are connected to an integrated circuit 170. This may be achieved using a pair of connecting wires per receive coil and per transmit coil. The integrated circuit may comprise high impedance inputs for connecting the wires from the receive coils. An example of the connecting wires is illustrated in FIG. 2. First connecting wires 111 are connected with open ends of the first receive coil 110. Second connecting wires 121 are connected with open ends of the second receive coil 120. Third connecting wires 131 are connected with open ends of the third receive coil 130. Connecting wires 151 are connected with open ends of the transmit coil 150.

Figure 4:
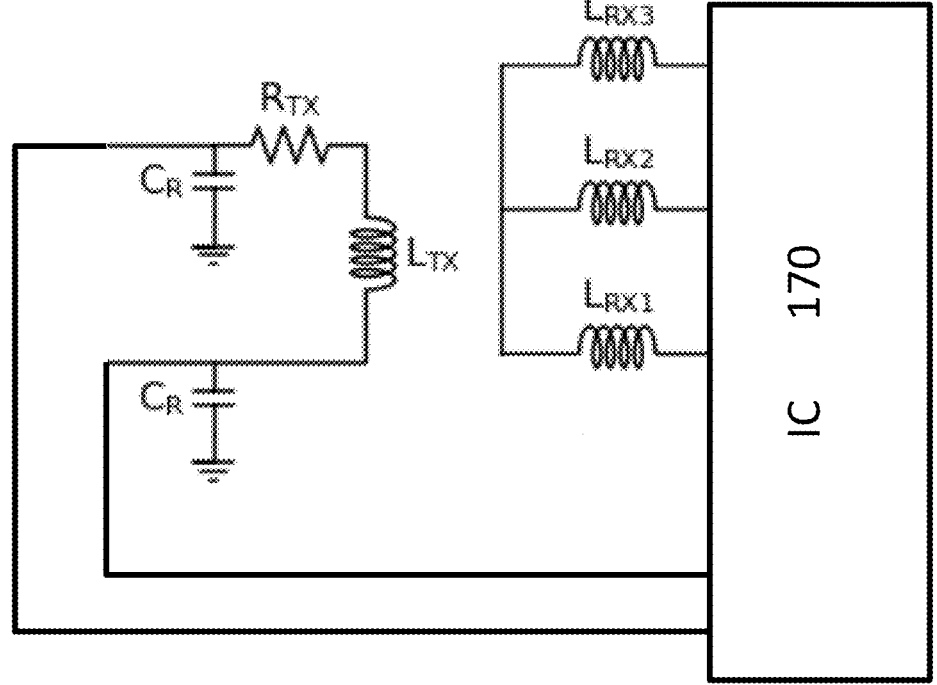
Figure 5:
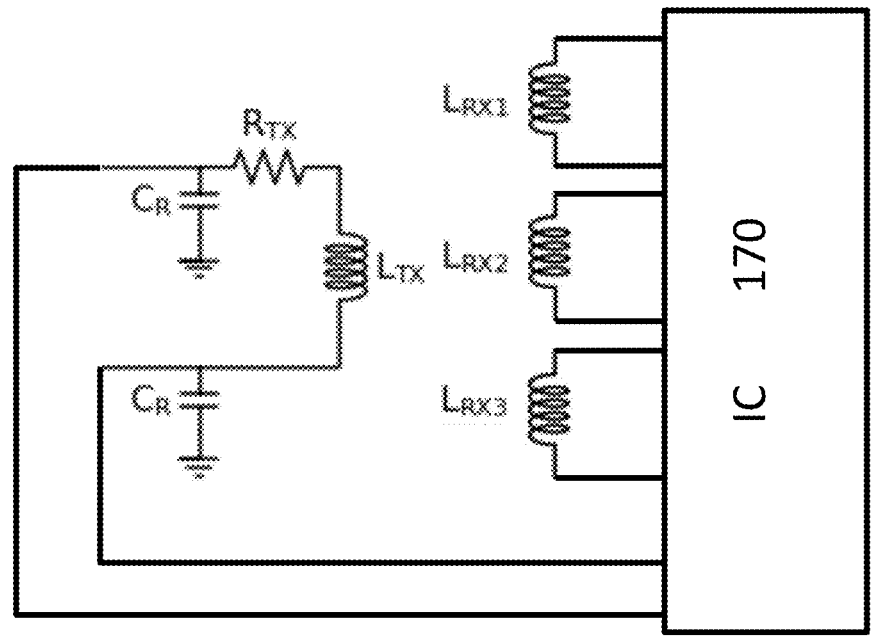
Figure 6:
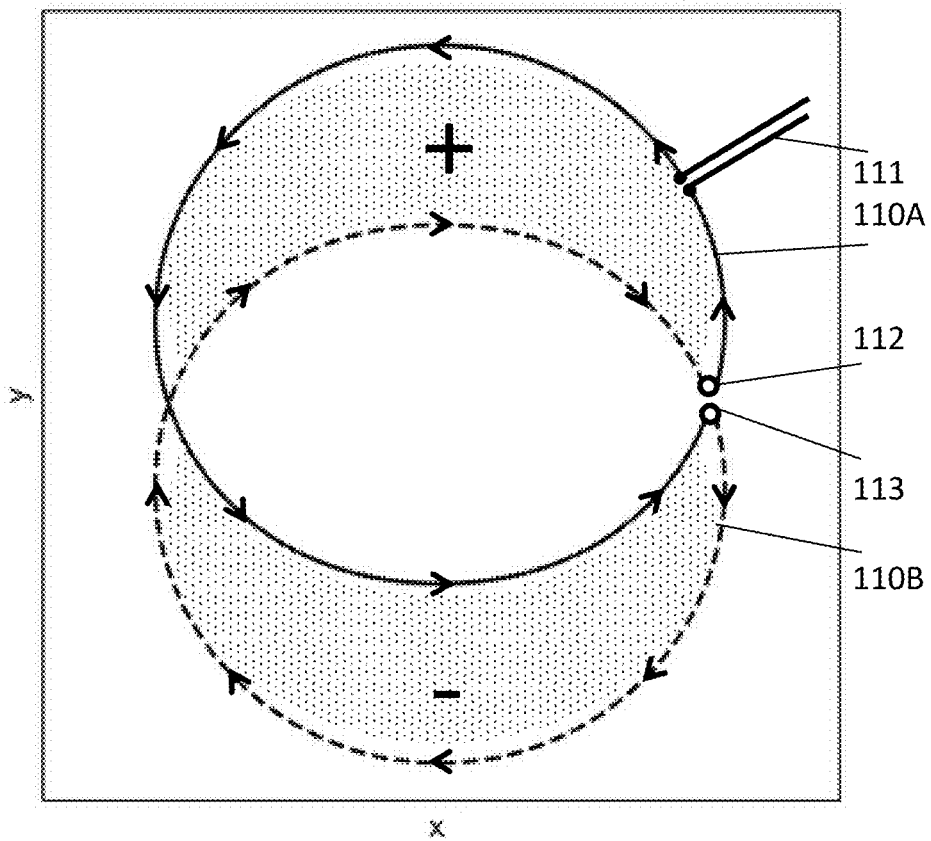
FIG. 6 shows a schematic drawing of a coil comprising a first conductive strand connected with a second conductive strand for a 360° position sensor in accordance with embodiments of the present invention.

Different connections of the receive coils with the IC 170 are possible. These are illustrated in FIGS. 4, 5, and 6. In these figures $L_{RX1}$ corresponds with the first receive coil, $L_{RX2}$ corresponds with the second receive coil, and $L_{RX3}$ corresponds with the third receive coil. Each receive coil has a first open end and a second open end. The coil $L_{TX}$, $R_{TX}$ corresponds with the transmit coil.

Figure 3:
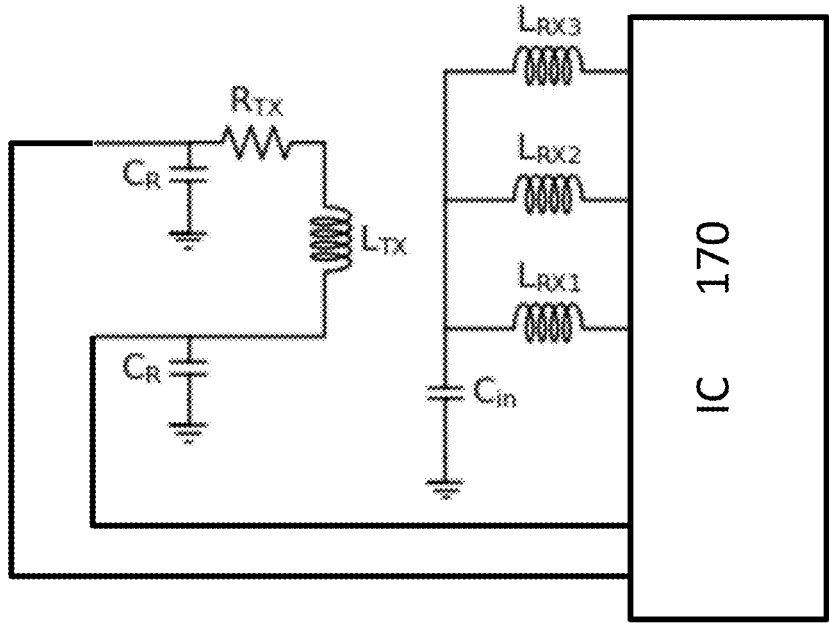
FIG. 3 to FIG. 5 show schematic drawings illustrating different configuration for connecting the transmit and receive coils with the integrated circuit.

In FIG. 3 the first open ends of the receive coils are connected together and are capacitively coupled to ground. The second open ends are connected to the IC 170.

In FIG. 4 first open ends of the receive coils are connected together and are left floating, and second open ends are connected to the IC.

In FIG. 5 the first open ends of the receive coils and the second open ends of the receive coils are connected to the IC 170. The signals which are read by the IC are processed and their common mode signal is removed.

An example of a first conductive strand 110A connected with a second conductive strand 110B is shown in FIG. 6. When exciting the transmit coil by applying a current through the transmit coil, this will induce a voltage at the open ends of the receive coils which are connected with connecting wires 111. These open ends can be connected with an integrated circuit (not shown) for measuring a voltage between the open ends. In this example an anti-clockwise voltage is travelling over the first strand 110A and a clockwise voltage is travelling over the second strand 110B. The first strand is represented by a fixed line and the second strand is represented by a dashed line. The strands may for example change from the front to the back of the PCB or vice versa, such that two strands can cross without making a short circuit. The connection between the front and the back is made using vias (vertical interconnect access). This is applicable for different position sensors (angular and linear) in accordance with embodiments of the present invention. Both the first strand 110A and the second strand 110B have open ends 112, 113. The first strand 110A and the second strand 110B are electrically connected at open ends 112 and 113 so that a continuous loop is formed.

In embodiments of the present invention the open ends of the receive coils are connected to the integrated circuit for measuring the voltage between them. Alternatively one open end may be connected to ground and another open end may be connected to the integrated circuit.

Designing the receive coils of an angular position sensor may be done by defining 210 (see for example FIG. 1) a primitive function which is substantially sinusoidal. This step is followed by converting 220 the primitive function to polar coordinates given the predefined electrical period for defining the first strand of the first receive coil. The second strand of the first receive coil may be obtained by shifting the primitive function over 180° before converting it to polar coordinates. For a linear position sensor the primitive function is scaled to obtain a strand with a given electrical period.

A position sensor in accordance with embodiments of the present invention is based on a 3 receive coil arrangement, with each coil comprising a first strand and a second strand whose shape is derived from a substantially sinusoidal primitive function.

In embodiments of the present invention 3 receive coils feed their signals to an IC. This IC may be configured for performing offset compensation. The offset may for example be the signal which is measured in the absence of a target. It may for example be remove by subtracting a fixed quantity from the digitized signals. Instead of a fixed quantity the offset to be compensated may be calculated as a fixed factor stored in memory times the amplitude of the signal on the transmit coil. The IC may also be configured for performing an angle calculation procedure substantially equivalent to a Clarke transformation. The angle calculation procedure may follow the offset compensation.

In a second aspect embodiments of the present invention relate to a method of forming a position sensor. An exemplary coil design strategy according to a method 200 in accordance with an embodiment of the present invention is shown in FIG. 1. The design is started by defining 210 a primitive function, which is substantially sinusoidal. Starting from this function, a basic strand design can be obtained. In this example the strand design is obtained from the primitive function by rewriting 220 it in polar coordinates and rescaling it by the desired number of electrical periods. In this example the conversion is done as follows: if f (theta)

is the primitive function and N the desired number of electrical periods, then the x-y coordinates defining the strands read as:

$$-x = f(N*\text{theta})*\cos(\text{theta})$$

$$y = f(N*\text{theta})*\sin(\text{theta})$$

where theta varies between 0 and 360°, The basic strand (also referred to as first strand) described here needs to be complemented 220 with a second strand, which is nothing else than the same path of the basic strand, only shifted in the predefined direction by the electrical period divided by 2. This second strand may be obtained from a primitive function which is shifted over 180° compared to the primitive function of the first strand. In this example the predefined direction is the angular direction and the receive coils have an angular electrical period. In the top and bottom graph the first strand (in the angular case also referred to as a winding) is shifted angularly by 180°/N to obtain the second strand. In the top graph this is 180 electrical degrees. The two strands are connected in a way to create a series of alternating clockwise and counter-clockwise turning loops. These connected strands define a complete receive coil. Two more receive coils are added to the design by simply replicating 230 the first coil, only shifting the 2 other coils by the electrical period divided by 3 and by the electrical period multiplied with ⅔ (e.g. 120 and 240 electrical degrees). This may be achieved by a primitive function of the second receive coil which is shifted over 120° compared to the primitive function of the first receive coil (the primitive function for the respective strands are considered) and by a primitive function of the third receive coil which is shifted over 240° compared to the primitive function of the first receive coil. Once the receive coils are defined, a transmit coil is added. In the example the transmit coil is simply a circular coil with multiple turns placed on the close periphery of the receive coils. In embodiments of the present invention the center of the transmit coil is on the rotation axis of the conductive target. It is advantageous that the transmit coil is circular because such a circular transmit coil generates a magnetic field pattern which is rotationally invariant, and hence does not generate unwanted signals in the receive coils.

The conductive target may have a plurality of flanges arranged in a periodic arrangement. These flanges preferably are identical. The flanges may for example be formed by teeth on a circular target. If a plurality of teeth are present, these teeth preferably are identical.

In the example of FIG. 1 the sensor is completed by a conductive target which overlaps the receive coils and has N teeth (also referred to as protrusions), one for each electrical period. In the examples of FIG. 1, the target is a metallic piece with N teeth spanning each 180 electrical degrees. In the 360° capable design (top graph) this means a half moon target 160. The coilset may be coupled to an IC that takes care of exciting the transmit coil and reading the receive coil signals. The IC processes the incoming signals by performing an angle calculation. The angle calculation comprises the removal of the common mode signal, offset compensation, and extraction of the angle. This could be for example be performed with a Clarke transformation or a tracking loop.

Figure 7:
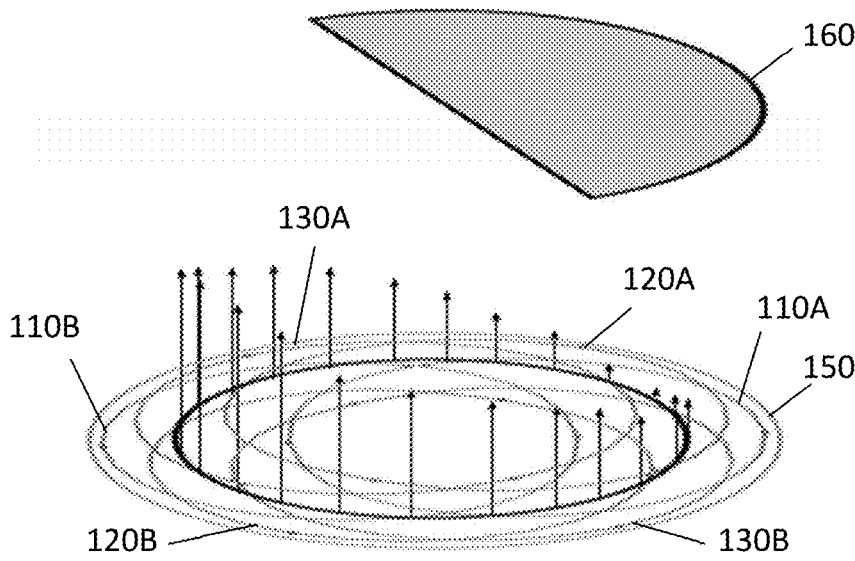
FIG. 7 schematically shows the angular dependence of the field pattern generated by the target of a 360° capable position sensor in accordance with embodiments of the present invention.
Figure 8:
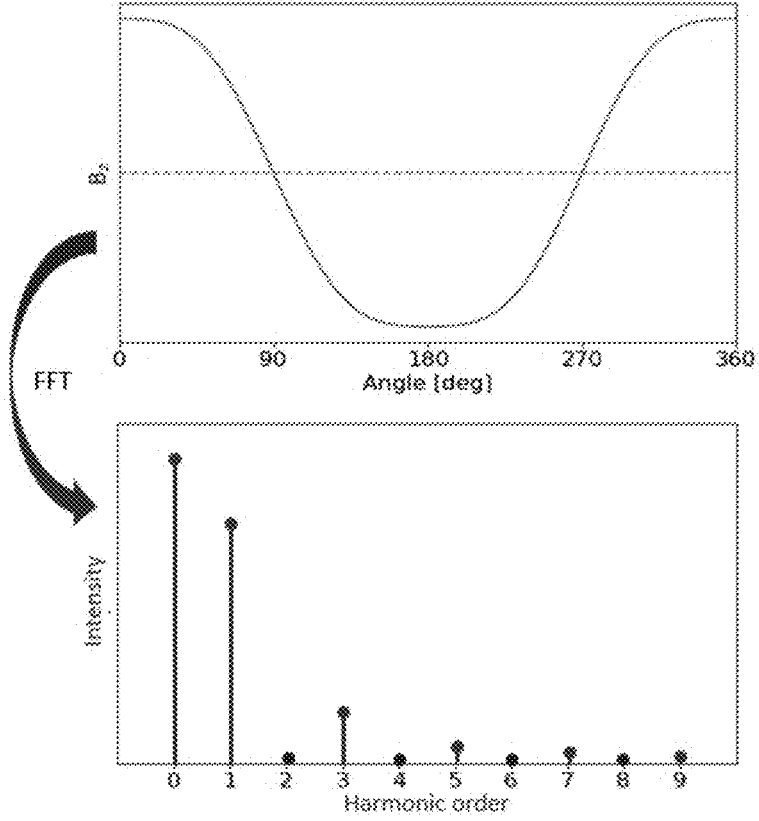
FIG. 8 has a top graph which shows the magnitude of the magnetic field orthogonal to the surface of the receive coils as a function of the angle along a circular line centered with the coils and a bottom graph which shows the Fourier transform of the signal from one of the coils.

The reasons behind the choice of this approach are illustrated in FIG. 7 and FIG. 8 for a 360° capable sensor. The angular dependence of the field pattern generated by the target is not sinusoidal in nature. This is illustrated in the top graph of FIG. 8 which shows the magnitude of the magnetic field orthogonal to the surface of the receive coils in function of the angle. The pattern will be dominantly sinusoidal, but there are also deviations. If an harmonic analysis is performed, all the harmonics will be found in the field pattern. These harmonics are very much unwanted, as an harmonic of order n will generate an angular error with periodicity n+1, whose intensity is proportional to the relative intensity of the n$^{th}$ harmonic with respect to the fundamental harmonic. These harmonics are shown in the bottom graph of FIG. 8 which shows the FFT of the field pattern depicted in the top graph of FIG. 8.

The design approach chosen in this invention has the advantage of eliminating the errors coming from the most important harmonics.

At index 0 the signal resulting from the transmit coil is shown.

At index 1 the first harmonic being the useful signal is shown.

First of all, all the even harmonics are rejected because of the use of a first strand and a second strand shifted in the predefined direction by the electrical period divided by 2. In case of a rotational position sensor this combination of first and second strand may also be referred to as a winding anti-winding pair. Even harmonics in the field pattern generate the same field in the first strand and the second strand. Due to the fact that the two strands are connected so that their voltages subtract, even harmonics in the field pattern do not generate any parasitic signal. This is for example illustrated by the shaded +/− areas in FIG. 6.

By increasing the airgap between the conductive target and the coils the amplitude of the odd harmonics relative to the first harmonic can be decreased.

It is found by the inventor that the error of the position sensor can be reduced using a triphase approach via common mode removal, due to the elimination of the third harmonic component. The inventor noticed that in a triphase system the 3$^{rd}$ harmonic appears as common mode. Third harmonics components in the field pattern generate a signal in each receive coil. Due to the triphase approach, this signal will be the same in the three receive coils. It is, therefore, an advantage of embodiments of the present invention that the third harmonic components can be significantly reduced or even removed by removing the common mode of the signals. The removal of the common mode signal may be achieved using an IC.

The fifth harmonic is thus the lowest order harmonic which is not rejected automatically. Higher order harmonics can be neglected as their intensity progressively decreases as their order increases. A 5$^{th}$ harmonic component in the signals generates a 6$^{th}$ harmonic component in the angular error profile.

Figure 9:
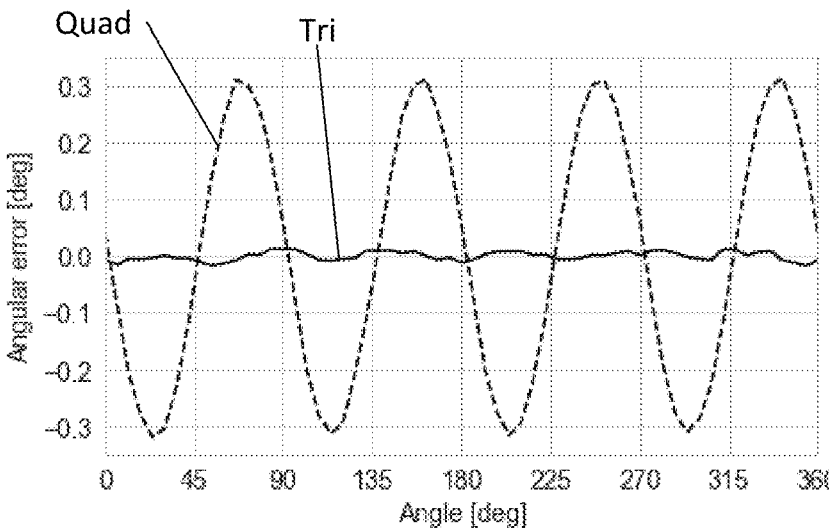
FIG. 9 shows the angular error (Tri) from a 360° sensor in accordance with embodiments of the present invention and it shows the angular error (Quad) of a prior art quadrature position sensor.

FIG. 9 shows the angular error (Tri) from the 360° sensor of FIG. 7. As can be seen, the error curve contains a very weak 6$^{th}$ order component, due to the very low 5$^{th}$ harmonic component in the signals. As a comparison also the angular error (Quad) of a prior art quadrature position sensor is shown in FIG. 6. This curve contains a 4$^{th}$ order component, due to the 3$^{rd}$ order harmonic component in the receive signals.

In summary, the approach of the present invention, combining a triphase approach, a sinusoidal shaped coil, and an angle calculation based on common mode elimination before angle calculation provide low angular error and performance superior to the state of the art.

Figure 11:
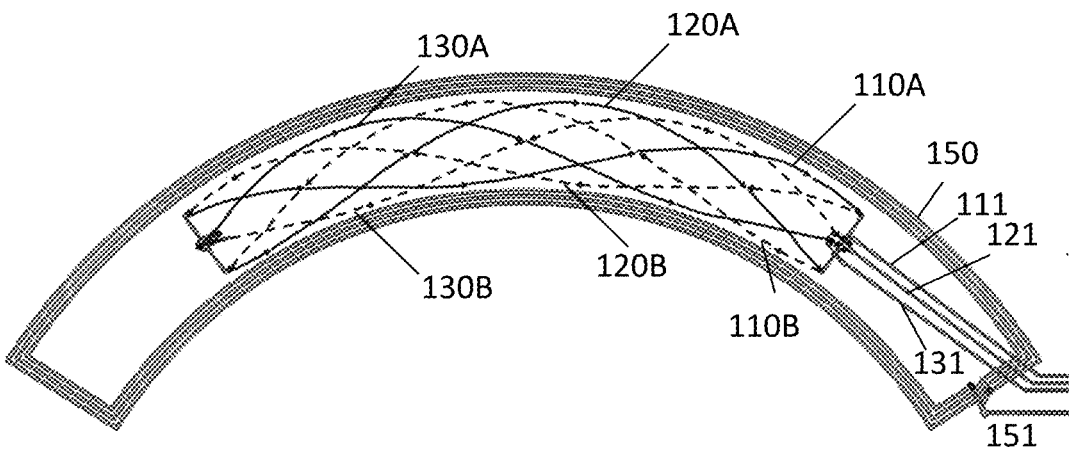
FIG. 11 shows a zoomed a schematic drawing of the transmit and receive coils of a position sensor in accordance with embodiments of the present invention.
Figure 12:
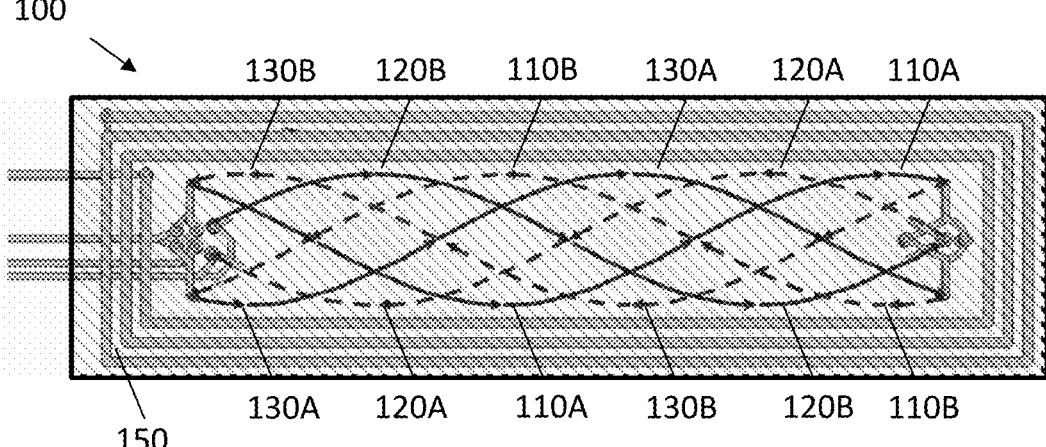
FIG. 12 shows a schematic drawing of a linear position sensor in accordance with embodiments of the present invention.

The invention is not limited to circular coils, also C-shaped position sensors and linear position sensors are possible. Examples thereof are shown in FIG. 10, 11 and FIG. 12.

Figure 10:
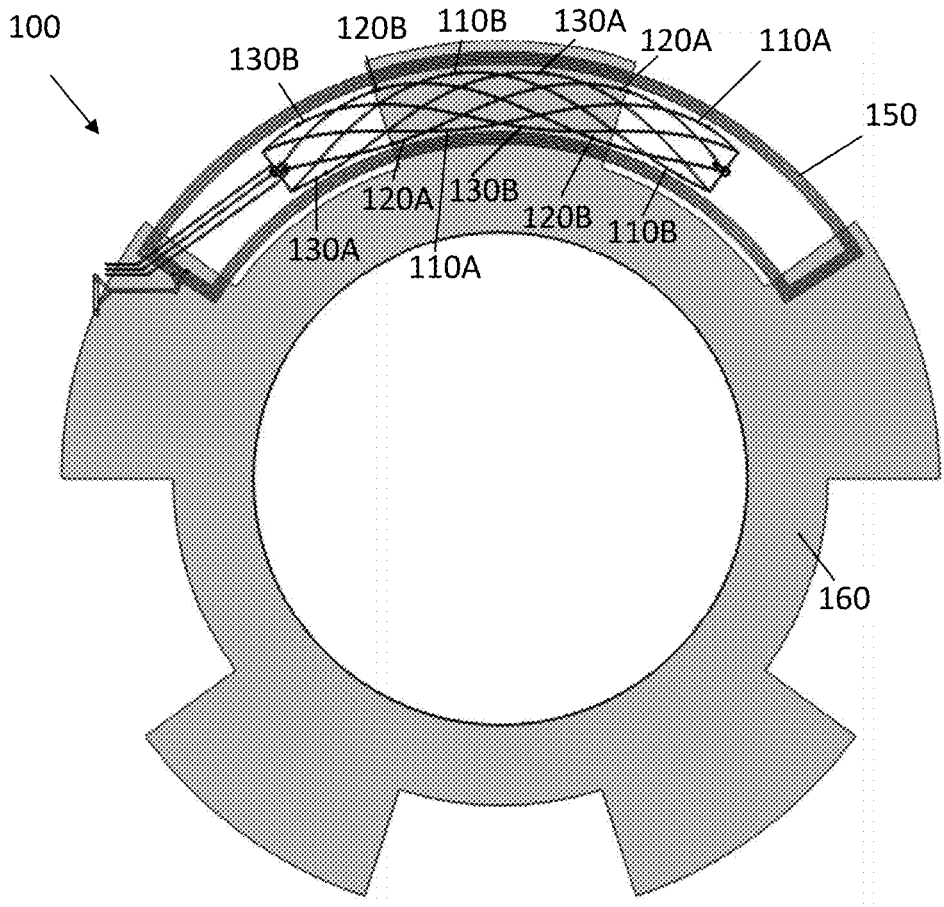
FIG. 10 shows a schematic drawing of a C-shaped position sensor in accordance with embodiments of the present invention.

In FIG. 10 the position sensor 100 is an angular position sensor. Compared to the angular position sensor of FIG. 2 the receive and transmit coils 110, 120, 130, 150 are only extending over a limited number of electrical periods and not over the complete circle. In the example the electrical period of the coils is the same as the period of the protrusions of the target. In FIG. 11 only the coils are shown and the first, second and third connecting wires 111, 121, 131 with the first, second, and third receive coils 110, 120, 130 and the connecting wires 151 with the transmit coil 150 are shown.

In embodiments of the present invention the protrusions have an identical shape. In the examples of FIG. 1 and FIG. 10 these protrusions are overlapping half of an electrical period and the gaps between the protrusions are spanning the other half. This is not strictly required. The protrusions may for example be smaller or wider. The percentage of the width of the protrusion compared to the width of one electrical period is also referred to as the duty cycle. In the example of FIG. 1 and FIG. 7 the conductive target has a duty cycle of 50%. The invention is, however, not limited thereto. It may for example range between 10 and 90%, or more specifically between 10 and 50%, for example between 25% and 50% or between 40% and 50%.

Also the linear position sensor can be obtained using a method in accordance with embodiments of the present invention. Thereby a substantially sinusoidal primitive function is defined 210. In a next step the primitive function is scaled to obtain a first strand with the electrical period. For the second stand a shifted primitive function (180°) is used. If the phases of the primitive functions of the first and second strand of the first coil are 0° and 180°, then those of the second coil are 60° and 240°, and those of the third coil are 120° and 300°.

For the linear position sensor 100 the conductive target may for example be a conductive plate which can be moved over the receive and transmit coils 110, 120, 130, 150. The plate may for example be rectangular. For the linear position sensor the receive coils 110, 120, 130 are extending in the predefined direction. The target can be moved and its position can be detected along this predefined direction which is a linear direction. The first strand and the second strand of a coil are connected such that a continuous coil is formed between two open ends. In the example illustrated in FIG. 8 the voltage induced in the first strand 110A of the first coil 110, which is induced by a current in the transmit coil, goes from right to left and the voltage induced in the second strand 110B of the first coil 110 goes from left to right. The coils have a longitudinal electrical period. This electrical period may be repeated N times with N a natural number. The transmit coil 150 is enclosing the receive coils 110, 120, 130.

Also the coil design of position sensors with C-shaped coils or of linear position sensors is scalable. It is thereby advantageous that coils can be designed for applications requiring for example multiple electrical periods over a full mechanical period.

In a third aspect embodiments of the present invention relate to the use of a position sensor in accordance with embodiments of the present invention. Thereby the transmit coil is excited using an excitation signal. Thereby a current is generated in the transmit coil 150. The excitation signal may be an oscillating signal. The frequency of the oscillating signal may for example range between 2 and 60 MHz. This may be application dependent. For some application the oscillating signal may for example range between 2 and 5 MHz. For other applications a range between 20 and 40 MHz may for example be more preferable. By exciting the transmit coil a voltage is induced at the open ends of the receive coils. These voltages are dependent on the position of the target because the target changes the inductive coupling between the transmit coil and receive coils. The voltages over the open ends, or equivalent signals, are measured and the obtained signals/voltages are processed for obtaining the position of the conductive target. In embodiments of the present invention processing at least comprises removing a common mode component of the received signals. The common mode component may be removed by combining the signals. It is thereby advantageous that the third harmonic is removed. It is found by the inventor that the third harmonic would otherwise significantly contribute to the error and that this third harmonic is common in the signals of the 3 different coils.

The invention claimed is:

1. An angular position sensor for determining an angular position of a conductive target, the position sensor comprising:

at least one transmit coil;

a first, second and third receive coil enclosed by the transmit coil, wherein each receive coil has a predefined electrical period which is the same for each receive coil and wherein each receive coil comprises a first conductive strand and a second conductive strand, wherein the complete first strand of a receive coil is obtained from a single conversion of a substantially sinusoidal primitive function to polar coordinates given the electrical period, and wherein the primitive function of the second strand is the primitive function of the first strand shifted over 180°, and wherein both strands are electrically connected so that a continuous coil is formed with two open ends, and wherein the primitive function of a strand of the second receive coil is the primitive function of a corresponding strand of the first receive coil shifted over 120°, and wherein the primitive function of a strand of the third receive coil is the primitive function of the corresponding strand of the first receive coil shifted over 240°;

the conductive target with a surface parallel with a surface of the receive coils, and orthogonal to a rotation axis of the conductive target and wherein the surface of the conductive target overlaps with the surface of the receive coils and wherein the conductive target is a half moon target; and an integrated circuit which is configured for exciting the transmit coil, thus inducing signals on the receive coils, and for reading the signals from the receive coils or a combination of the signals, and for processing these signals, wherein the position sensor is configured for removing a common mode signal from these signals.

2. The angular position sensor according to claim 1, wherein the conductive target has flanges arranged in a periodic arrangement and wherein the flanges are identical.

3. The angular position sensor according to claim 1, wherein the first strand and the second strand are provided on a printed circuit board.

4. The angular position sensor according to claim 3, wherein the first strand and/or the second strand alternate between a first and second side of the printed circuit board for enabling crossings between both strands.

5. The angular position sensor according to claim 1, wherein processing the signals comprises offset compensation of the signals.

6. The angular position sensor according to claim 1, wherein processing the signals comprises extracting a position of the conductive target from the obtained signals.

7. The angular position sensor according to claim 1, wherein the transmit coil is a circular coil with multiple turns placed on a close periphery of the receive coils.

8. The angular position sensor according to claim 7, wherein the angular position is obtained by a Clarke transformation or by a tracking loop.

9. Use of an angular position sensor according to claim 1, wherein:

the transmit coil is excited using an excitation signal;

signals from the first, second, and third receive coils are read; and the obtained signals are processed for obtaining the position of the conductive target, wherein processing at least comprises removing a common mode component of the received signals.

10. A method of forming an angular position sensor, the method comprising:

defining a substantially sinusoidal primitive function;

converting the primitive function to polar coordinates given a predefined electrical period for defining a complete first strand of a first receive coil using a single conversion of the primitive function;

obtaining a second strand from the primitive function shifted over 180°;

obtaining a second receive coil, wherein the primitive function of a strand of the second receive coil is the primitive function of a corresponding strand of the first receive coil shifted over 120°;

obtaining a third receive coil, wherein the primitive function of a strand of the third receive coil is the primitive function of the corresponding strand of the first receive coil shifted over 240°;

providing a conductive target with a surface parallel with a surface of the receive coils, and orthogonal to a rotation axis of the conductive target and wherein the surface of the conductive target overlaps with the surface of the receive coils and wherein the conductive target is a half moon target; and providing an integrated circuit which is configured for exciting a transmit coil, for reading signals from the receive coils, and for processing these signals, wherein processing the signals comprises removing a common mode signal from these signals.

* * * * *